(12) United States Patent
Sonobe et al.

(10) Patent No.: US 11,386,354 B2
(45) Date of Patent: Jul. 12, 2022

(54) INFORMATION PROCESSING APPARATUS, INFORMATION PROCESSING METHOD, AND PROGRAM

(71) Applicant: NS Solutions Corporation, Tokyo (JP)

(72) Inventors: Isao Sonobe, Tokyo (JP); Takashi Mitsubuchi, Tokyo (JP); Hideaki Tanaka, Tokyo (JP); Hiroaki Takasu, Tokyo (JP); Kazuhiro Yamada, Tokyo (JP); Yasuhiro Mitsuno, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 268 days.

(21) Appl. No.: 16/605,729

(22) PCT Filed: Jun. 12, 2018

(86) PCT No.: PCT/JP2018/022374
§ 371 (c)(1),
(2) Date: Oct. 16, 2019

(87) PCT Pub. No.: WO2018/230551
PCT Pub. Date: Dec. 20, 2018

(65) Prior Publication Data
US 2020/0293553 A1    Sep. 17, 2020

(30) Foreign Application Priority Data

Jun. 16, 2017    (JP) .............................. JP2017-118417

(51) Int. Cl.
*G06F 16/00* (2019.01)
*G06N 20/00* (2019.01)
(Continued)

(52) U.S. Cl.
CPC .......... *G06N 20/00* (2019.01); *G06F 16/285* (2019.01); *G06F 40/237* (2020.01)

(58) Field of Classification Search
CPC ...... G06N 20/00; G06F 40/237; G06F 16/285
See application file for complete search history.

(56) References Cited

U.S. PATENT DOCUMENTS

| 2018/0285447 A1* | 10/2018 | Takemoto | ............. | G06F 16/335 |
| 2018/0336574 A1* | 11/2018 | Mohan | .................. | G06Q 50/01 |
| 2020/0293553 A1* | 9/2020 | Sonobe | .................. | G06N 20/00 |

FOREIGN PATENT DOCUMENTS

| JP | H01188934 A | 7/1989 |
| JP | 2011170535 A | 9/2011 |

(Continued)

OTHER PUBLICATIONS

Liping Ma, John Shepherd, and Anh Nguyen. 2003. Document classification via structure synopses. In Proceedings of the 14th Australasian database conference—vol. 17 (ADC '03). Australian Computer Society, Inc., AUS, 59-65. (Year: 2003).*

(Continued)

*Primary Examiner* — Greta L Robinson
(74) *Attorney, Agent, or Firm* — ArentFox Schiff LLP

(57) ABSTRACT

A plurality of feature values are extracted from input data as document data, distributed representations of words that correspond to the respective extracted plurality of feature values is obtained, and the extracted plurality of feature values are aggregated into a plurality of classifications based on the obtained distributed representation.

16 Claims, 11 Drawing Sheets

(51) Int. Cl.
*G06F 16/28* (2019.01)
*G06F 40/237* (2020.01)

(56) References Cited

FOREIGN PATENT DOCUMENTS

| JP | 2015169951 A | 9/2015 |
| JP | 2018025874 A | 2/2018 |

OTHER PUBLICATIONS

International Search Report in related international application dated Sep. 5, 2018, PCT/JP2018/022374.

* cited by examiner

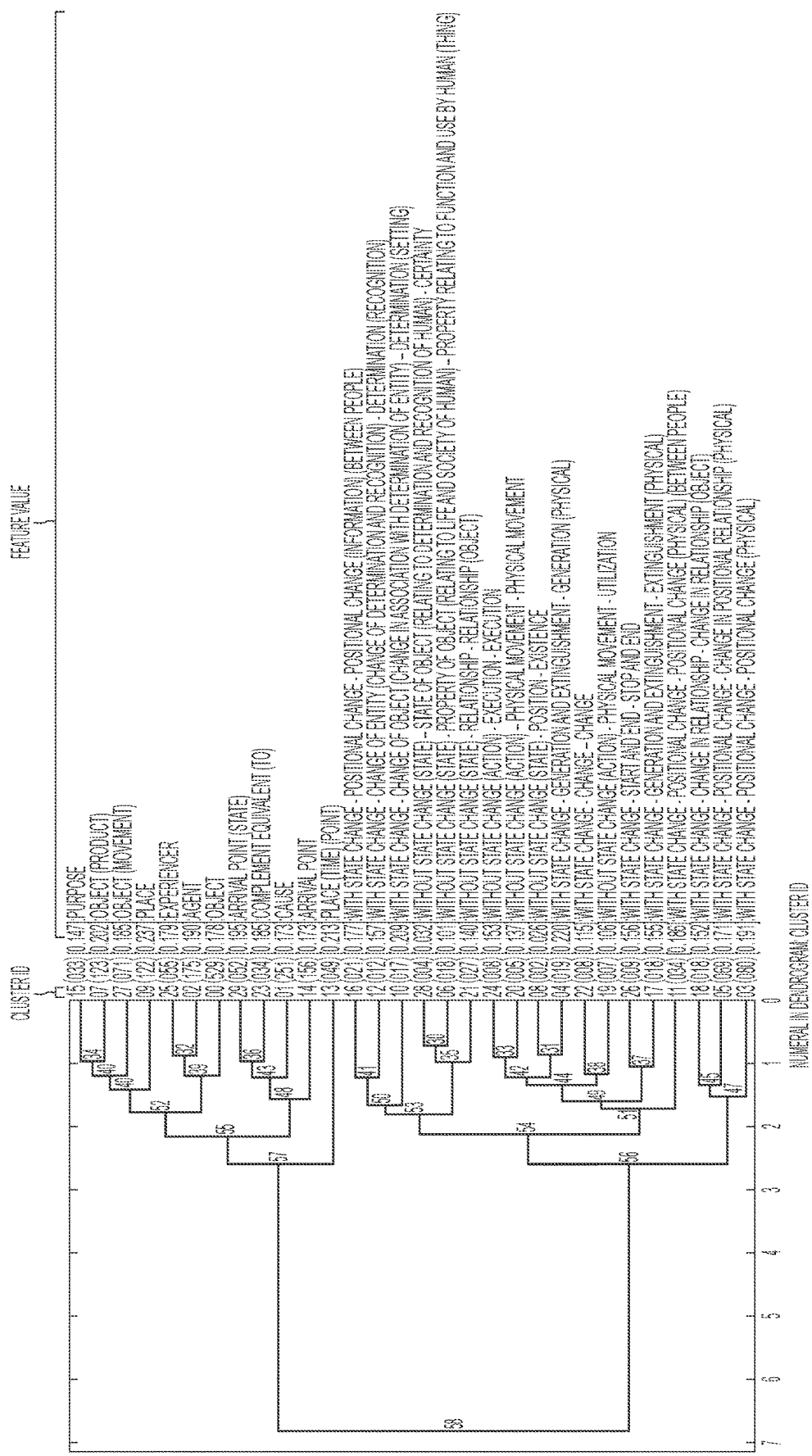

INFORMATION PROCESSING APPARATUS, INFORMATION PROCESSING METHOD, AND PROGRAM

CROSS-REFERENCE TO RELATED APPLICATIONS

The present application is a National Stage entry of International Application No. PCT/JP2018/022374, filed on Jun. 12, 2018, which claims priority to Japanese Patent Application No. 2017-118417, filed Jun. 16, 2017. The disclosures of the prior applications are incorporated by reference in their entirety.

TECHNICAL FIELD

The present invention relates to an information processing apparatus, an information processing method, and a program.

BACKGROUND ART

Recently, an Artificial Intelligence (AI) has been actively studied and developed, and has rapidly increased its practical applications. The AI is to artificially reproduce various perception and intelligence, such as learning, inferencing, and determining, demonstrated by a human using a computer.

Among AI, RPA (Robotic Process Automation, Digital Labor), which takes states of working and decision-making by a knowledge worker as a model to robotize them, is to achieve automation and efficiency of an operation. In the RPA, the AI has evaluated a document.

Regarding such a technique to evaluate a quality of a document, there is proposed a technique to evaluate a quality of a document and present a document that serves as a sample in Patent Literature 1.

Patent Literature 1 discloses a document quality evaluation system that presents a text to be improved and an example of a text to be a sample in addition to an evaluation result of a quality of a text document group to an inputter. The document quality evaluation system performs a syntax analysis on each of texts in the text document group, scores a quality of the text document group on a plurality of evaluation items, presents the evaluation result to a first user, extracts a first text group that corresponds to a condition to cause a low evaluation in the lowest evaluation item for the first user and a second text group that corresponds to a condition to cause a high evaluation for a second user who is evaluated higher than the first user in the lowest evaluation item, extracts first and second texts high in similarity degrees from the first and second text groups, respectively, and presents the first text as an exemplary sentence subject to be improved and the second text as an exemplary sample sentence.

CITATION LIST

Patent Literature

Patent Literature 1: Japanese Laid-open Patent Publication No. 2011-170535

SUMMARY OF INVENTION

Technical Problem

An evaluation of a document is performed based on feature values extracted from document data in some cases. While various feature values can be extracted from the document data, the feature values extracted from the document data have many similar feature values, and thus being complicated. For example, even a user confirms these feature values, it is difficult to grasp what kind of document the document is. Therefore, there has been a demand to aggregate the similar feature values extracted from the document data.

Patent Literature 1 could not aggregate the similar feature values extracted from the document data.

Solution to Problem

Therefore, an information processing apparatus of the present invention includes an extractor, an obtainer, and an aggregator. The extractor is configured to extract a plurality of feature values from input data as document data. The obtainer is configured to obtain distributed representations of words that correspond to the respective plurality of feature values extracted by the extractor. The aggregator is configured to aggregate the plurality of feature values extracted by the extractor into a plurality of classifications based on the distributed representation obtained by the extractor.

Advantageous Effects of Invention

The present invention ensures aggregating similar feature values extracted from document data.

BRIEF DESCRIPTION OF DRAWINGS

FIG. 4 is a drawing illustrating an exemplary dendrogram indicating clustering results.

DESCRIPTION OF EMBODIMENTS

The following describes embodiments of the present invention based on drawings.

Embodiment 1

(Outline of Process of this Embodiment)

An outline of a process of an embodiment will be described. In this embodiment, an information processing apparatus 100 is assumed to be a main body of processing. The information processing apparatus 100 is an information processing apparatus, such as a personal computer (PC), a server device, a tablet device, a smartphone, and the like.

In this embodiment, the information processing apparatus 100 extracts feature values on which an individuality of a user, who is in charge of evaluating ticket data, is reflected from ticket data (document data) in an object management system, and converts words corresponding to the extracted feature values into distributed representations. Then, the information processing apparatus 100 clusters the extracted feature values based on distances between words converted into the distributed representations to aggregate the extracted feature values.

The information processing apparatus 100 accepts specifying clusters that include the feature values used for determining the evaluation criteria, and determines the evaluation criteria for the ticket data on which the individuality of the user, who is in charge of evaluating the ticket data, is reflected based on the feature values included in the clusters indicated by the accepted specification.

(Hardware Configuration of Information Processing Apparatus)

Figure 1:
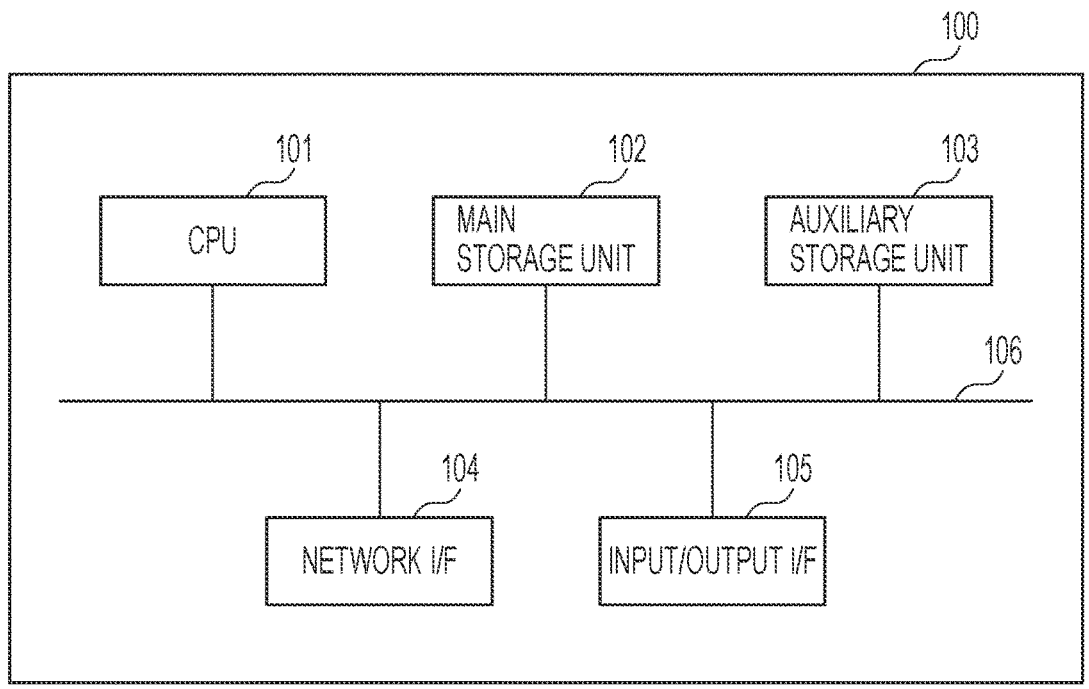
FIG. 1 is a drawing illustrating an exemplary hardware configuration of an information processing apparatus.

FIG. 1 is a drawing illustrating an exemplary hardware configuration of the information processing apparatus 100.

The information processing apparatus 100 includes a CPU 101, a main storage unit 102, an auxiliary storage unit 103, a network I/F 104, and an input and output I/F 105. Each of the elements is communicatively coupled to one another via a system bus 106.

The CPU 101 is a central processing unit that controls the information processing apparatus 100. The main storage unit 102 is a storage device, such as a Random Access Memory (RAM) that functions as a work area for the CPU 101 and a temporary storage location of data.

The auxiliary storage unit 103 is a storage device that stores various setting information, various programs, teacher data, various dictionary data, various model information, and the like. The auxiliary storage unit 103 is configured as a storage medium for, for example, Read Only Memory (ROM), a hard disk drive (HDD), a solid state drive (SSD), a flash memory, and the like.

The network I/F 104 is an interface used for a communication with an external device via a network, such as internet and LAN. The input and output I/F 105 is an interface used for inputting information from an input device, such as a computer mouse, a keyboard, and an operating unit of a touch panel. The input and output I/F 105 is also an interface used for outputting information to an output device, such as a display, a display unit of a touch panel, a speaker, and the like.

The CPU 101 executes a process based on a program stored in the auxiliary storage unit 103, thereby achieving a function of the information processing apparatus 100 described later in FIG. 2, a process of a flowchart described later in FIG. 3, and the like.

(Function Configuration of Information Processing Apparatus)

Figure 2:
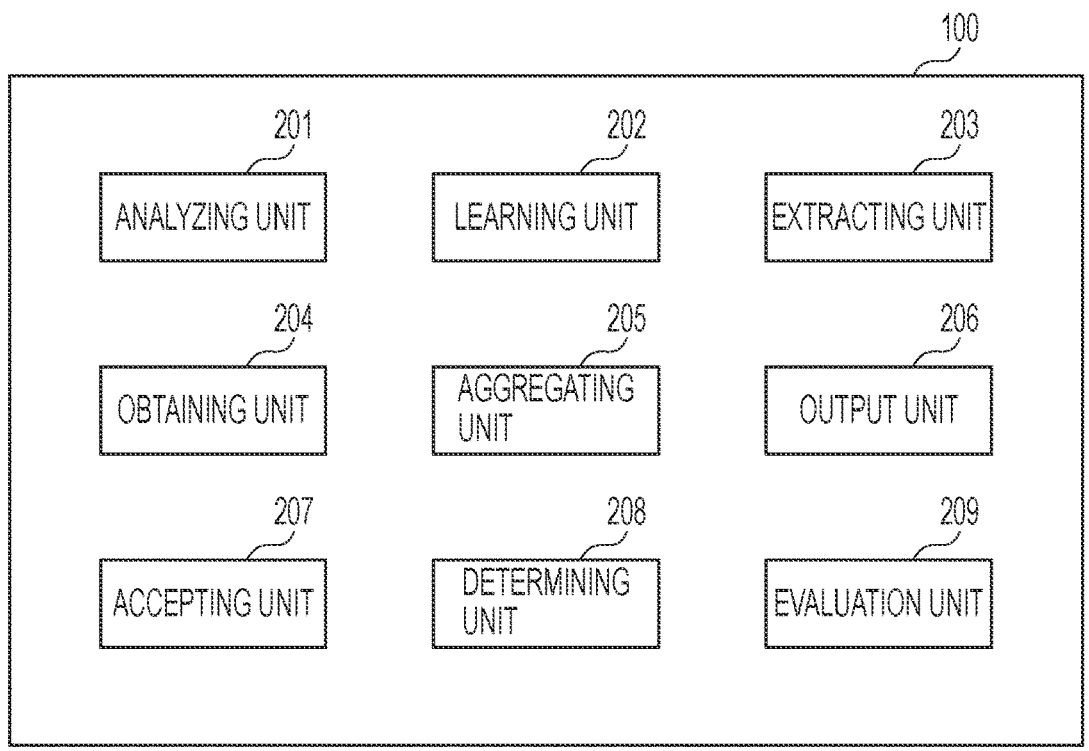
FIG. 2 is a drawing illustrating an exemplary function configuration of the information processing apparatus.

FIG. 2 is a drawing illustrating an exemplary function configuration of the information processing apparatus 100.

The information processing apparatus 100 includes an analyzing unit 201, a learning unit 202, an extracting unit 203, an obtaining unit 204, an aggregating unit 205, an output unit 206, an accepting unit 207, a determining unit 208, and an evaluation unit 209.

The analyzing unit 201 performs an analyzation, such as a morphological analysis, dependency parsing, word categorizing, and determination of a feature value of a segment in document data (for example, labeling semantic role on segment) on document data.

The learning unit 202 learns a classification model used for identifying good or bad in quality of ticket data based on teacher data of a positive example configured of ticket data preliminarily confirmed as a good quality by a user and teacher data of a negative example configured of ticket data preliminarily confirmed as a bad quality by the user. In this embodiment, the teacher data is preliminarily stored in the auxiliary storage unit 103 and the like.

The learning unit 202 learns this classification model using, for example, Naive Bayes, Random Forest, and the like. The teacher data is one example of input data.

The extracting unit 203 extracts feature values on which an individuality of the user is reflected from feature values of the teacher data based on respective levels of contribution of the feature values of the teacher data in the classification model learned by the learning unit 202.

The obtaining unit 204 converts words corresponding to the feature values extracted by the extracting unit 203 into distributed representations.

The distributed representation is a technique to represent a word with a real vector of a plurality of dimensions (for example, a hundred to three hundred dimensions). There exists, what is called, a distributional hypothesis that assumes that a meaning of a word in a document is determined from peripheral words (context words). Assuming the distributional hypothesis, a word can be represented as a vector in which each element indicates a probability of appearance of each context word. Since words that serve as the context words are enormous (one trillion or more), the size of this vector also becomes enormous (one trillion dimensions or more). However, the most elements of this vector are zero. Therefore, this vector can be compressed (for example, compressed to a size of a hundred dimensions). In the distributed representation, assuming the distributional hypothesis, a word is represented as thus compressed vector.

The closer the meanings of the words are, the closer the vectors of the words represented in the distributed representations become. With this property, the vectors indicated by the distributed representations of the words corresponding to the respective feature values extracted by the extracting unit 203 are close vectors as the meanings are close.

In this embodiment, the information processing apparatus 100 clusters these feature values based on distances between the vectors indicated by the distributed representations of the words corresponding to the feature values extracted by the extracting unit 203 using this property. The distance between the vectors is an index to indicate a degree of difference between the vectors and is, for example, a distance between ending points of two vectors when starting points of the vectors are at the same point. With this, the information processing apparatus 100 can cluster the feature values extracted from the document data such that ones with similar meanings are included in an identical cluster. The cluster is one example of a classification in which the feature values are aggregated.

The word represented in the distributed representation also has the following property: that is, the property that the closer a vector that indicates a difference between a word (1) and a word (2) and a vector that indicates a difference between a word (3) and a word (4) are, the more similar a relationship between the word (1) and the word (2) and a relationship between the word (3) and the word (4) are.

The aggregating unit 205 clusters the feature values extracted by the extracting unit 203 based on the words converted into the distributed representations by the obtaining unit 204. That is, the aggregating unit 205 clusters the feature values extracted by the extracting unit 203 based on the distances between the vectors of the distributed representations of the corresponding words, and determines a plurality of clusters in which the feature values are aggregated.

The output unit 206 outputs information on each cluster determined by the aggregating unit 205, information of the words corresponding to the feature values included in each cluster, and the like.

The accepting unit 207 accepts specifying a cluster including the feature values used for determining an evaluation criterion from the plurality of clusters determined by the aggregating unit 205.

The determining unit 208 determines the evaluation criterion for the ticket data on which the individuality of the user is reflected based on the feature values included in the cluster indicated by the specification accepted by the accepting unit 207.

The evaluation unit 209 evaluates the ticket data using the evaluation criterion determined by the determining unit 208.

(Evaluation Criterion Determination Process)

Figure 3:
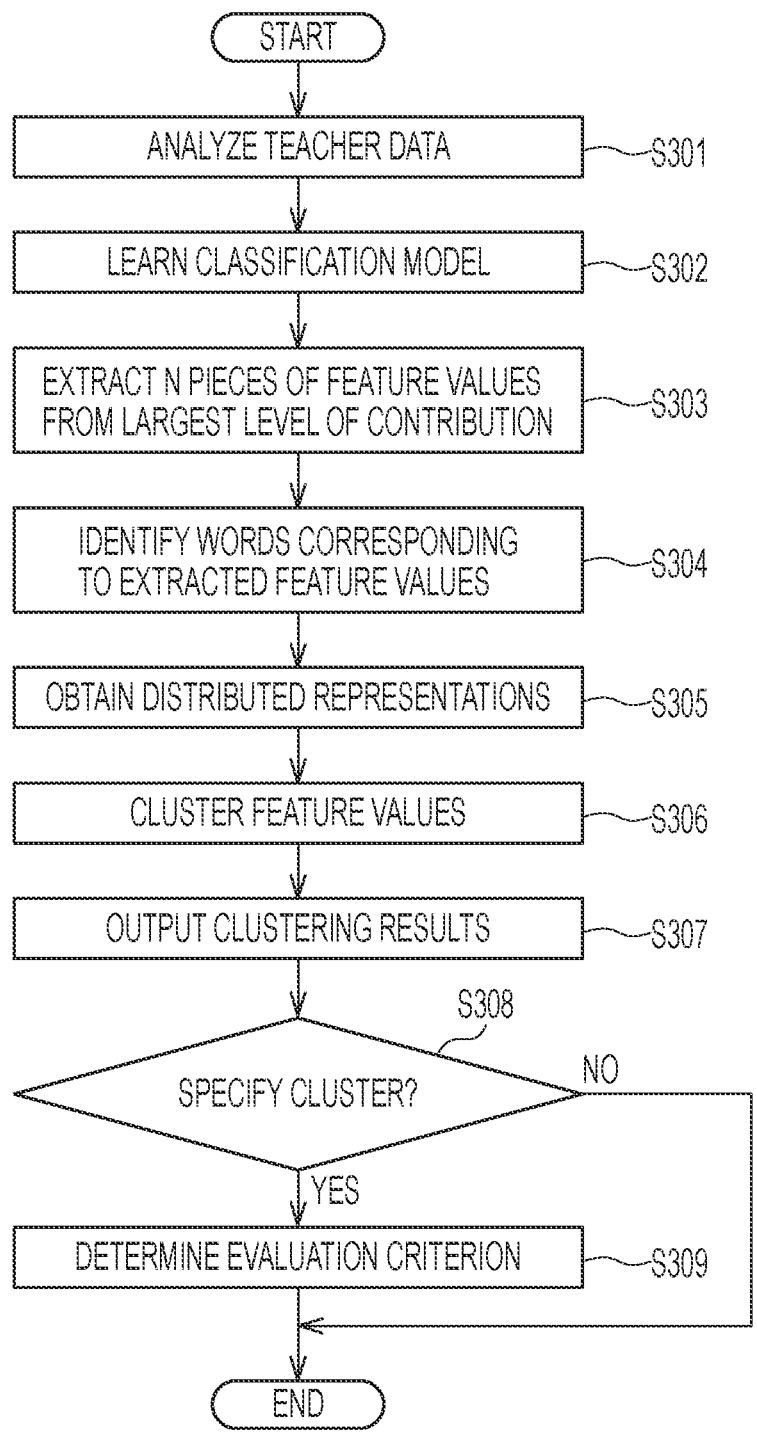
FIG. 3 is a flowchart illustrating an exemplary evaluation criterion determination process.

FIG. 3 is a flowchart that illustrates an exemplary evaluation criterion determination process.

At S301, the analyzing unit 201 performs an analysis process on teacher data stored in the auxiliary storage unit 103. The analyzing unit 201 performs an analysis process, such as a morphological analysis, dependency parsing, word categorizing, labeling a feature value (for example, a semantic role) on each segment, on each ticket data in the teacher data. The morphological analysis is a process to decompose a document into morphemes (smallest units having meaning in language) to determine parts of speech and the like of the respective morphemes. The dependency parsing is a process to determine which segment depends on which segment. The word categorizing is a process that refers to a dictionary and the like that stores correspondence information between words and categories to determine categories of words in a document. The labeling a semantic role on each segment is a process that analyzes a structure for a text in a document to label a role of a segment (for example, an "agent," an "object" and the like) in interpreting a meaning of the predicate on each segment depending on the predicate in the text. The analyzing unit 201, for example, uses a semantic role labeling tool to label a semantic role on a segment.

With the process at S301, the analyzing unit 201 extracts the feature values used for learning the classification model by the learning unit 202. In this embodiment, it is assumed that the analyzing unit 201 extracts semantic roles labeled on respective segments at S301 as the feature values used for learning the classification model by the learning unit 202. However, the analyzing unit 201 may extract categories of words or words themselves as the feature values used for learning the classification model by the learning unit 202. The analyzing unit 201 may extract combinations of the semantic roles labeled on the respective segments, the categories of the words, the words themselves, and the like as the feature values used for learning the classification model by the learning unit 202.

At S302, the learning unit 202 learns the classification model that identifies good or bad in quality of the ticket data based on the feature values extracted from the teacher data at S301.

The classification model learned at S302 is a model learned from the teacher data including positive example data preliminarily confirmed as the positive example by a user and negative example data preliminarily confirmed as the negative example by the user. Therefore, it can be assumed that the larger a level of contribution in this classification model is, the more the individuality of the user in evaluating the ticket data is reflected on the feature values. The level of contribution is an index that indicates how much the feature value contributes in identifying good or bad in quality of the ticket data.

At S303, the extracting unit 203 extracts the preliminarily determined number N (for example, 30) pieces of feature values in order from the largest levels of contribution in the classification model learned at S302 from the feature values extracted at S301, and thus, extracts the feature values on which the individuality of the user in evaluating the ticket data is reflected. In this embodiment, the extracting unit 203 determines the level of contribution of a certain feature value based on a probability of appearance of a segment that has the feature value in the positive example data and the negative example data in the teacher data. For example, the extracting unit 203 determines a value obtained by dividing the probability of appearance of the segment that has the feature value in the positive example data in the teacher data by the probability of appearance of the segment that has the feature value in the negative example data as the level of contribution of the feature value. Then, the extracting unit 203 identifies N pieces of levels of contribution in order from the largest one among the obtained levels of contribution to extract the feature values corresponding to the identified levels of contribution.

The extracting unit 203 may determine a variation amount of an error rate when values (the number of appearance) of the feature value extracted from the teacher data are shuffled between samples regarding a certain focused feature value as the level of contribution. The extracting unit 203 may determine a Gini coefficient as the level of contribution.

The extracting unit 203 may extract ones having the level of contribution in the classification model learned at S302 equal to or more than a preliminarily determined threshold value out of the feature values extracted at S301 as the feature values on which the individuality of the user in evaluating the ticket data is reflected.

At S304, the obtaining unit 204 identifies a head word of the segment corresponding to each feature value extracted at S303. The head word means a word that represents the segment, and is, for example, a noun part in the segment, a root form of a verb part in the segment, and the like. The obtaining unit 204, for example, uses the semantic role labeling tool to identify the head word from the segment. The head word in the segment that corresponds to each feature value extracted at S303 is one example of the word corresponding to each feature value extracted at S303.

At S305, the obtaining unit 204 obtains distributed representations of the words identified at S304. The obtaining unit 204, for example, obtains the distributed representations of the words identified at S304 through an unsupervised learning (word2vec, fastText, and the like).

At S306, the aggregating unit 205 clusters the feature values extracted at S303 based on the distributed representations obtained at S305. More specifically, the aggregating unit 205 clusters the feature values extracted at S303 based on distances between vectors indicated by the distributed representations obtained at S305. The vectors indicated by the distributed representations have a property that the closer the meanings of the words are, the closer the vectors become. Therefore, the aggregating unit 205 can aggregate the similar feature values. The aggregating unit 205, for example, generates a dendrogram described later in FIG. 4 as a result of the process at S306.

The aggregating unit 205, for example, uses a method for hierarchical clustering, such as Nearest Neighbor (NN) method and Ward's method, to cluster the feature values extracted at S303. The aggregating unit 205 may use a method for non-hierarchical clustering to cluster the feature values extracted at S303.

At S307, the output unit 206 outputs the result of the process at S306. The output unit 206, for example, outputs the result of the process at S306 by causing the display unit, such as a display coupled via the input and output I/F 105 and a monitor of an external device coupled via the network I/F 104 to display information indicative of the feature values determined at S307. The output unit 206 may, for example, output the result of the process at S306 in a format of a dendrogram as illustrated in FIG. 4.

FIG. 4 is a drawing illustrating an exemplary dendrogram (tree diagram) illustrating a progress of the clustering process at S306 in a hierarchical structure. Numerals written at ends of branches or branch points indicate cluster IDs. The clusters indicated by the IDs (15, 07, 27, 09, . . . , 05, 03) at right ends of the dendrogram in FIG. 4 are clusters that correspond to the respective feature values extracted at S303. A cluster that is made by two joined clusters is a cluster corresponding to the feature value in which the feature values of the joined two clusters are aggregated. For example, the cluster ID 34 is a cluster made by joining the cluster with an ID of 15 and the cluster with an ID of 07, and is a cluster corresponding to the feature value in which the feature value of the cluster with the ID of 15 and the feature value of the cluster with the ID of 07 are aggregated. The cluster corresponds to the feature value in which more similar clusters are aggregated when the number of joining is less. The cluster indicated by ID (58) at a left end of the dendrogram is a cluster in which all the clusters at the right end are joined.

In this embodiment, the output unit 206 outputs the result of the process at S306 by displaying a specification screen that includes the dendrogram in FIG. 4 and is used for specifying a category including the feature value used for determining the evaluation criterion on the display unit.

Figure 5A:
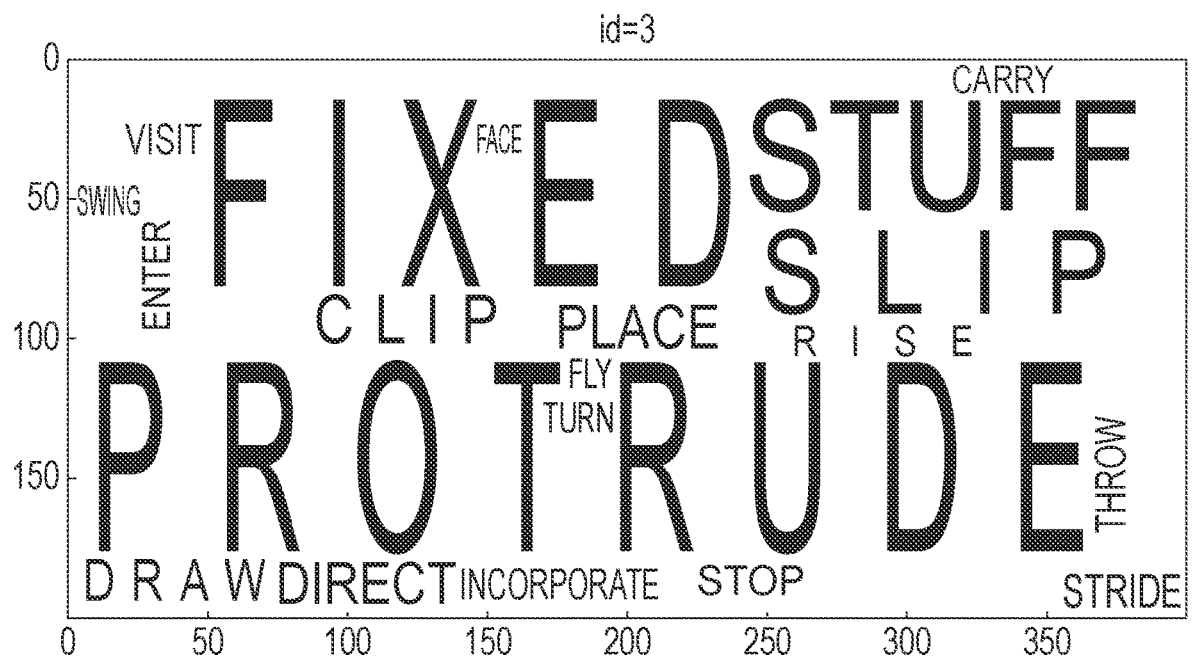
FIG. 5A is a drawing illustrating an exemplary word presentation screen.

When detecting, for example, an operation of placing a cursor over an ID on the specification screen, the output unit 206 displays a presentation screen that presents the head word in the segment corresponding to the feature value indicated by the cluster of the TD for which a selection operation is performed on the display unit. FIGS. 5A to O are drawings illustrating exemplary presentation screens that present the head word in the segment corresponding to the feature value indicated by the cluster of the ID. The presentation screens as in FIGS. 5A to O are exemplary information indicative of words corresponding to the feature values included in the cluster for each of the aggregated plurality of clusters. In this embodiment, the information processing apparatus 100 uses the teacher data that is document data in Japanese. Therefore, in the presentation screens as in FIGS. 5A to O, Japanese words that correspond to the feature values included in the corresponding cluster or words translated from those Japanese words into another language (for example, English) are presented.

The output unit 206 increases the respective words in size on the presentation screens in FIGS. 5A to O as the feature values corresponding to the words move close to a center of the cluster. The closer the feature value corresponding to the word is to the center of the cluster, the more average word to represent the cluster the word becomes. Therefore, the output unit 206 displays the word increased in size as the meaning of the word comes close to what the cluster means. With this, the user who visually perceives the presentation screen can understand what the cluster means more easily.

The output unit 206, for example, causes the presentation screen to include the preliminarily determined number of (for example, ten and twenty) words in order from the closest corresponding feature value to the center of the cluster. With this, the user who visually perceives the presentation screen can understand what the cluster means by visually perceiving only the preliminarily determined number of words without confirming all the words included in the cluster.

The user can confirm whether each cluster is a cluster in which the plurality of feature values are aggregated with unity or not, while visually perceiving the presentation screen corresponding to the cluster with each ID.

Figure 5B:
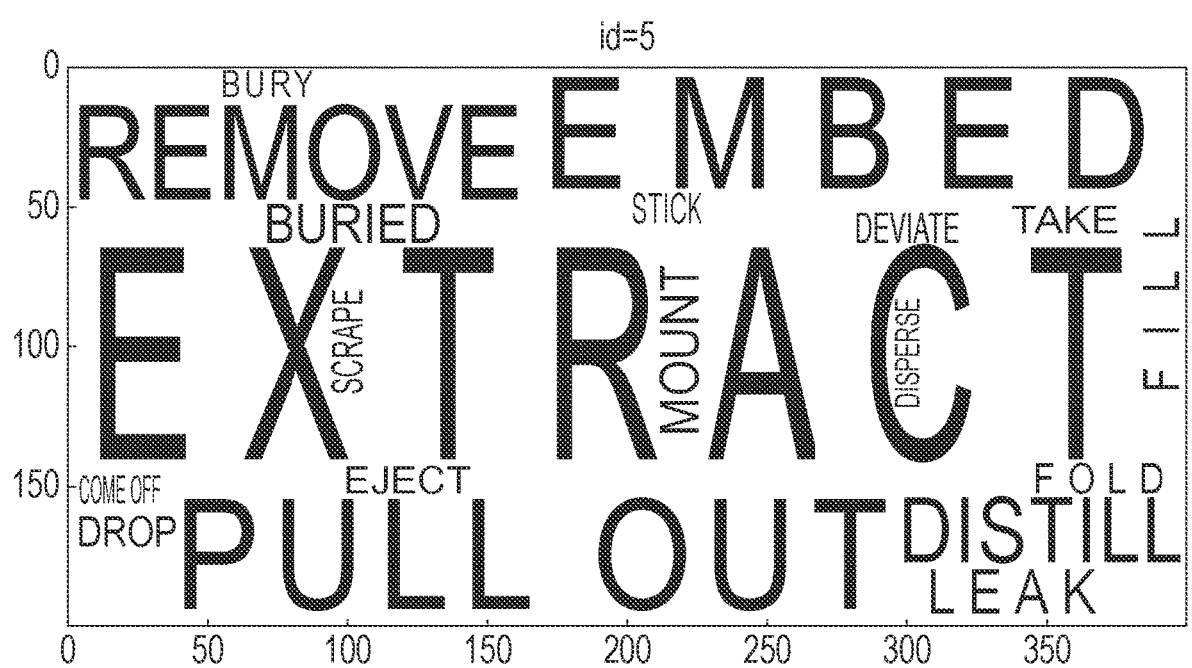
FIG. 5B is a drawing illustrating an exemplary word presentation screen.
Figure 5C:
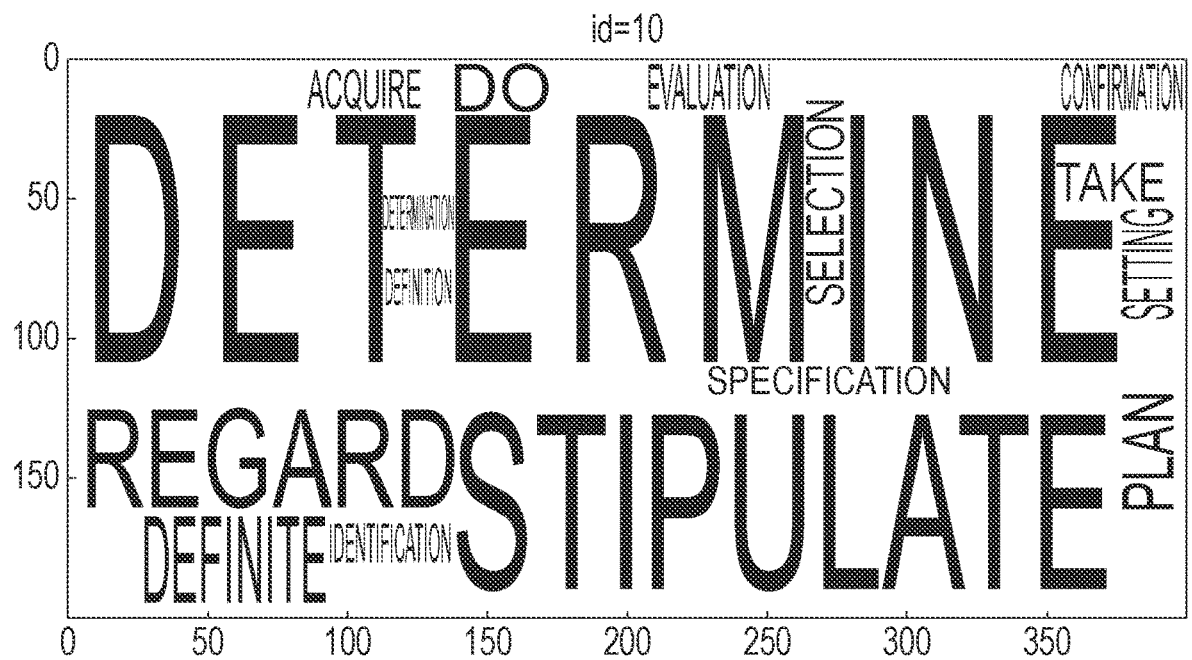
FIG. 5C is a drawing illustrating an exemplary word presentation screen.
Figure 5D:
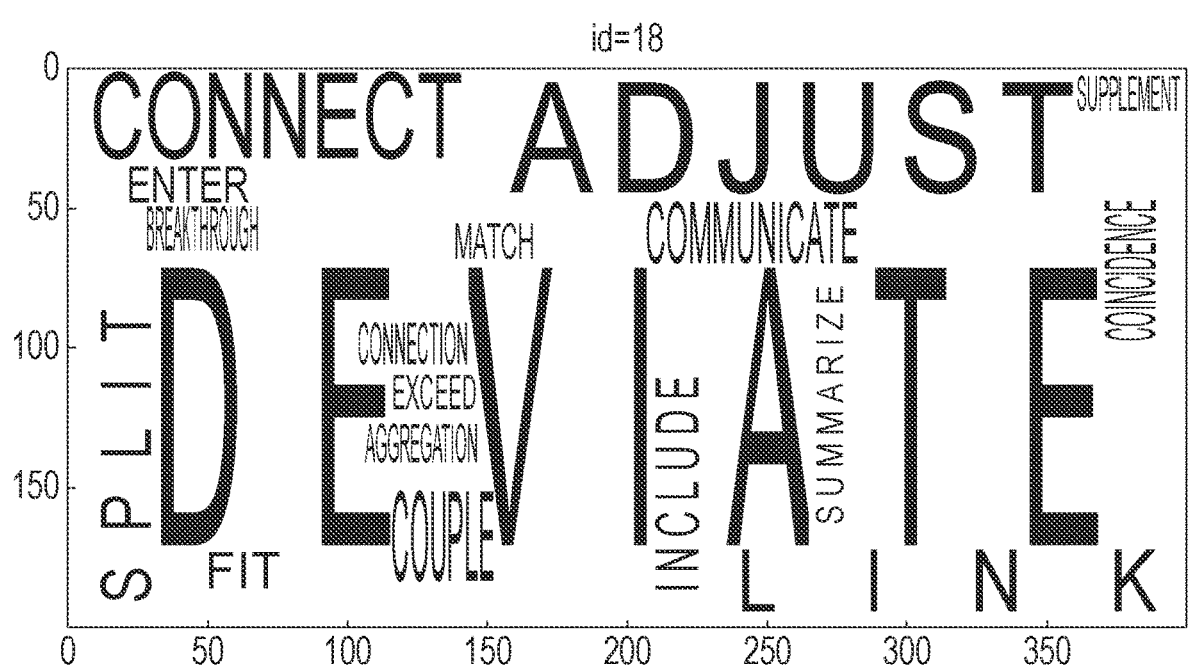
FIG. 5D is a drawing illustrating an exemplary word presentation screen.
Figure 5E:
FIG. 5E is a drawing illustrating an exemplary word presentation screen.
Figure 5F:
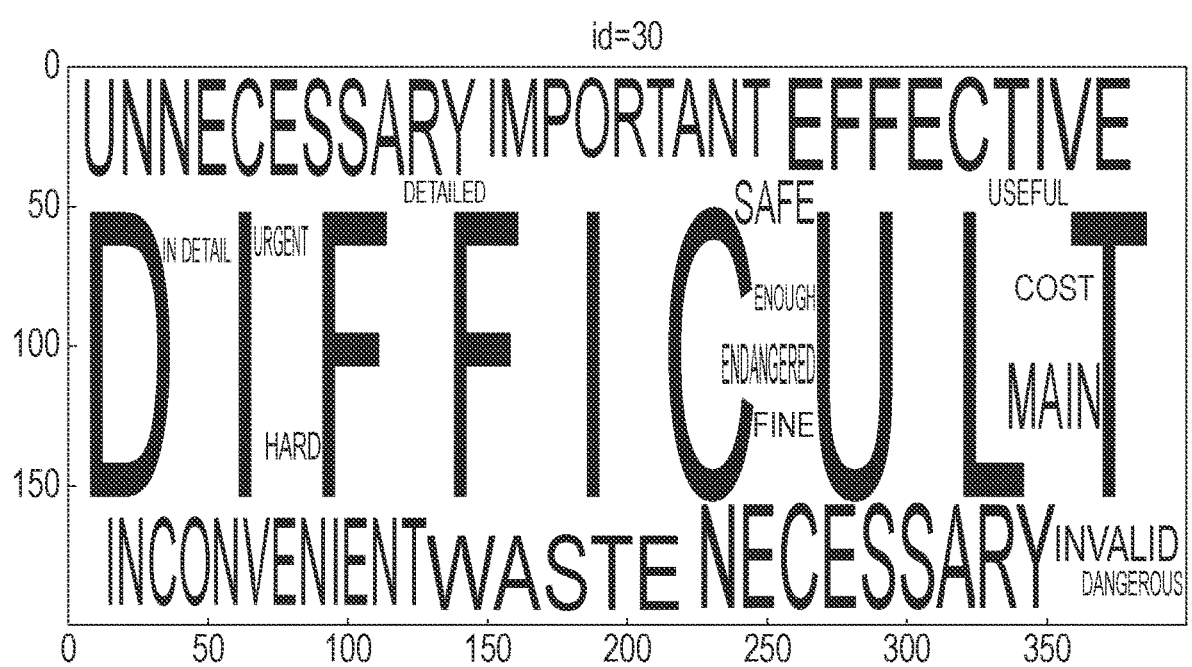
FIG. 5F is a drawing illustrating an exemplary word presentation screen.
Figure 5G:
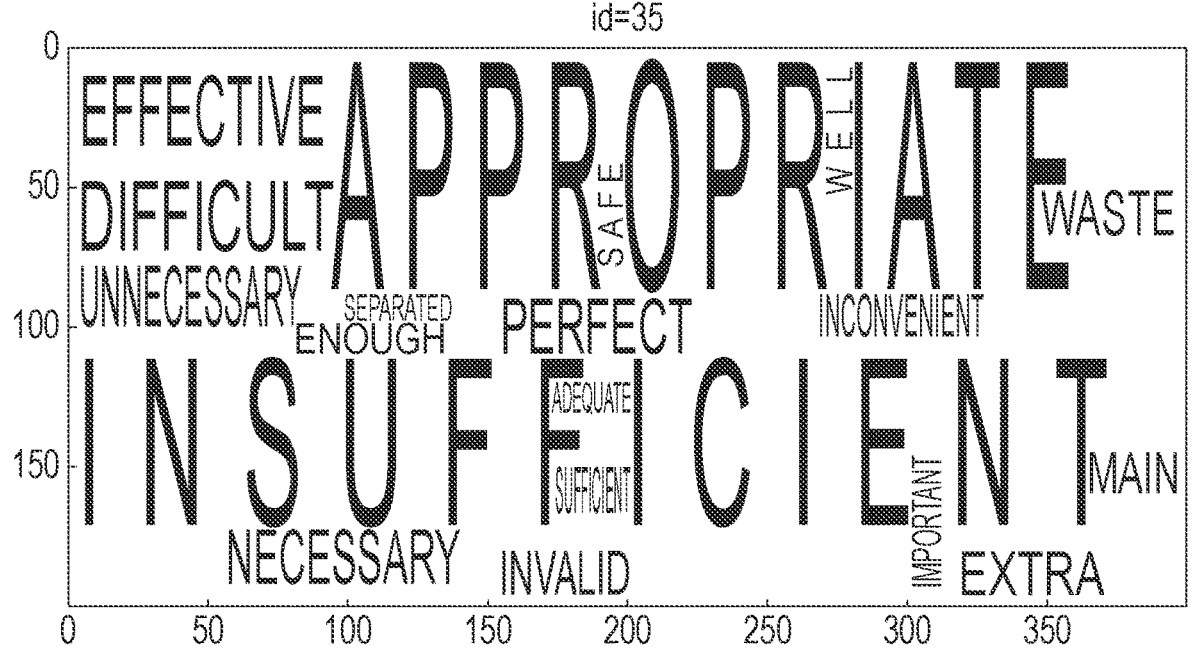
FIG. 5G is a drawing illustrating an exemplary word presentation screen.
Figure 5H:
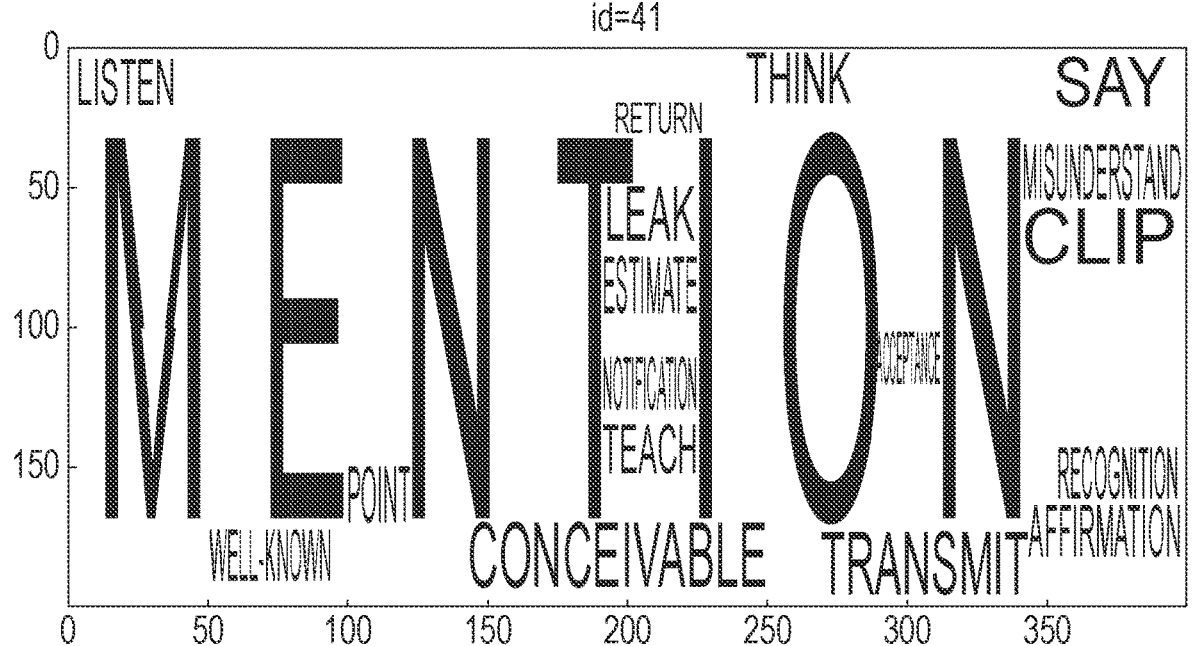
FIG. 5H is a drawing illustrating an exemplary word presentation screen.
Figure 5I:
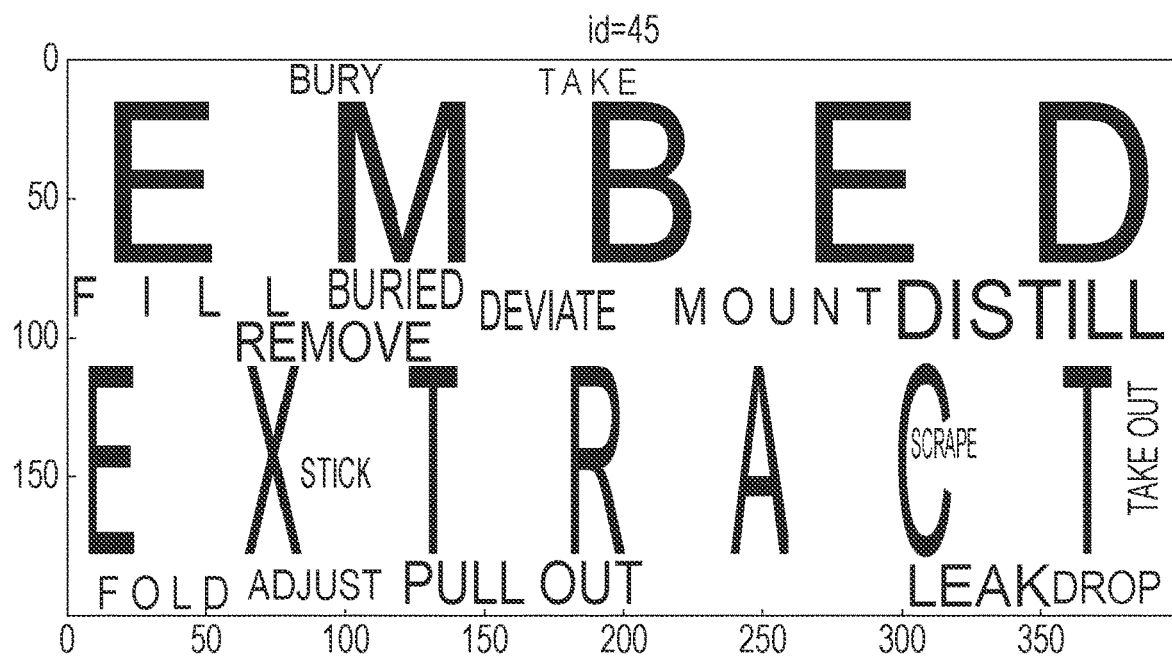
FIG. 5I is a drawing illustrating an exemplary word presentation screen.

The presentation screen in FIG. 5I is a presentation screen that corresponds to a cluster with an ID of 45 made by joining a cluster with the ID of 05 corresponding to FIG. 5B, a cluster with the ID of 18 corresponding to FIG. 5D. Viewing the presentation screen in FIG. 5I, each word is a word to indicate "a state change of a thing," and there can be seen a unity as a whole.

Figure 5J:
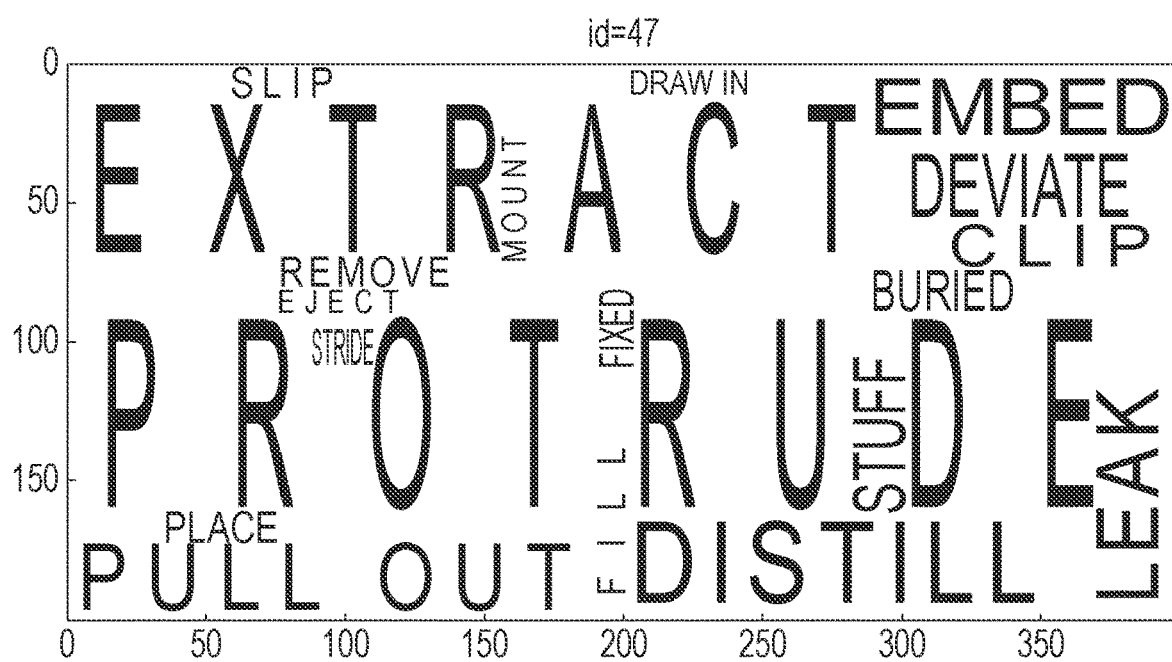
FIG. 5J is a drawing illustrating an exemplary word presentation screen.
Figure 5K:
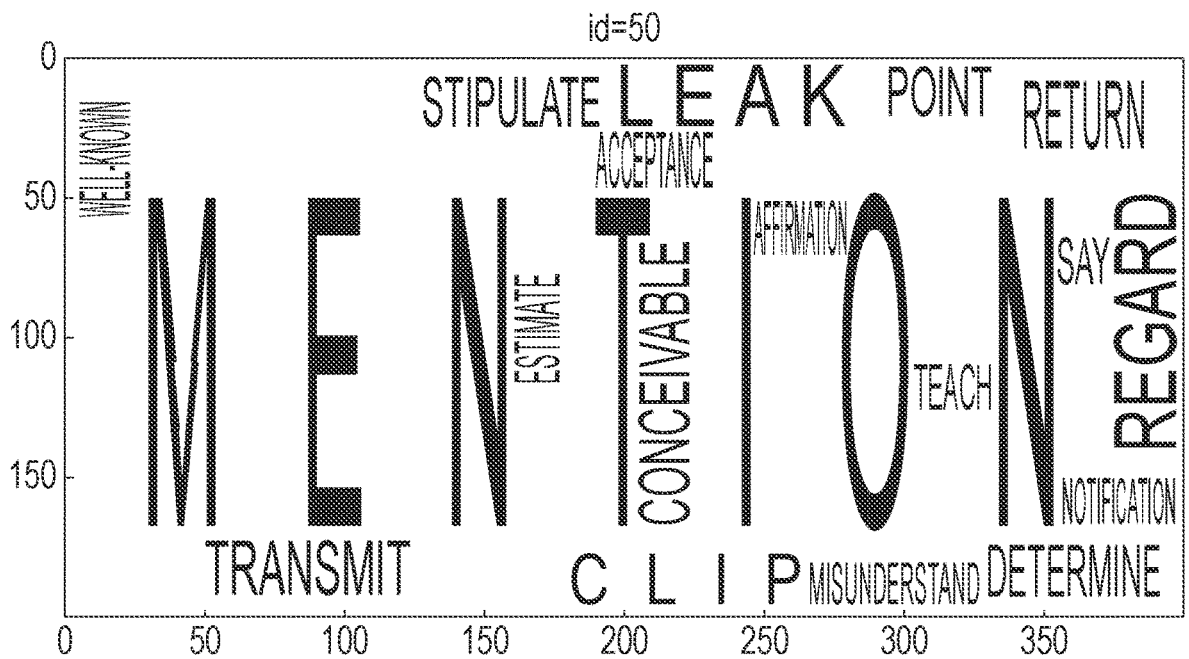
FIG. 5K is a drawing illustrating an exemplary word presentation screen.
Figure 5L:
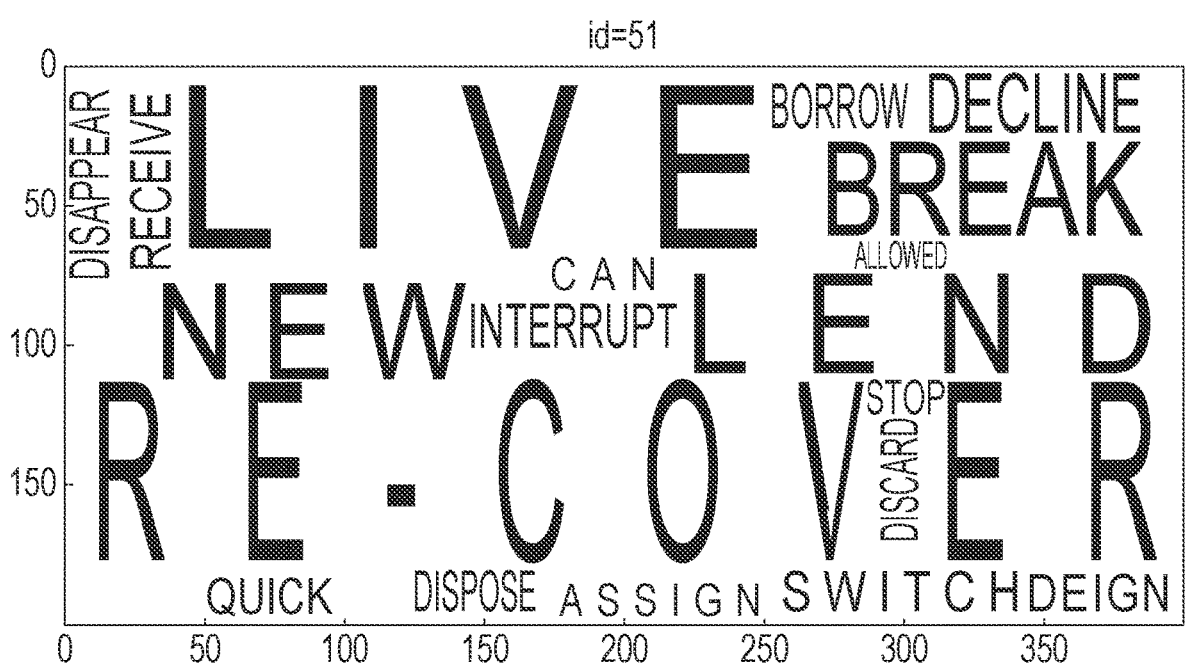
FIG. 5L is a drawing illustrating an exemplary word presentation screen.
Figure 5M:
FIG. 5M is a drawing illustrating an exemplary word presentation screen.

The presentation screen in FIG. 5J is a presentation screen that corresponds to a cluster with an ID of 47 made by joining a cluster with an ID of 03 corresponding to FIG. 5A and the cluster with the ID of 45 corresponding to FIG. 5I. Viewing the presentation screen in FIG. 5J, each word is a word to indicate "a state change of a thing," and there can be seen a unity as a whole.

Figure 5N:
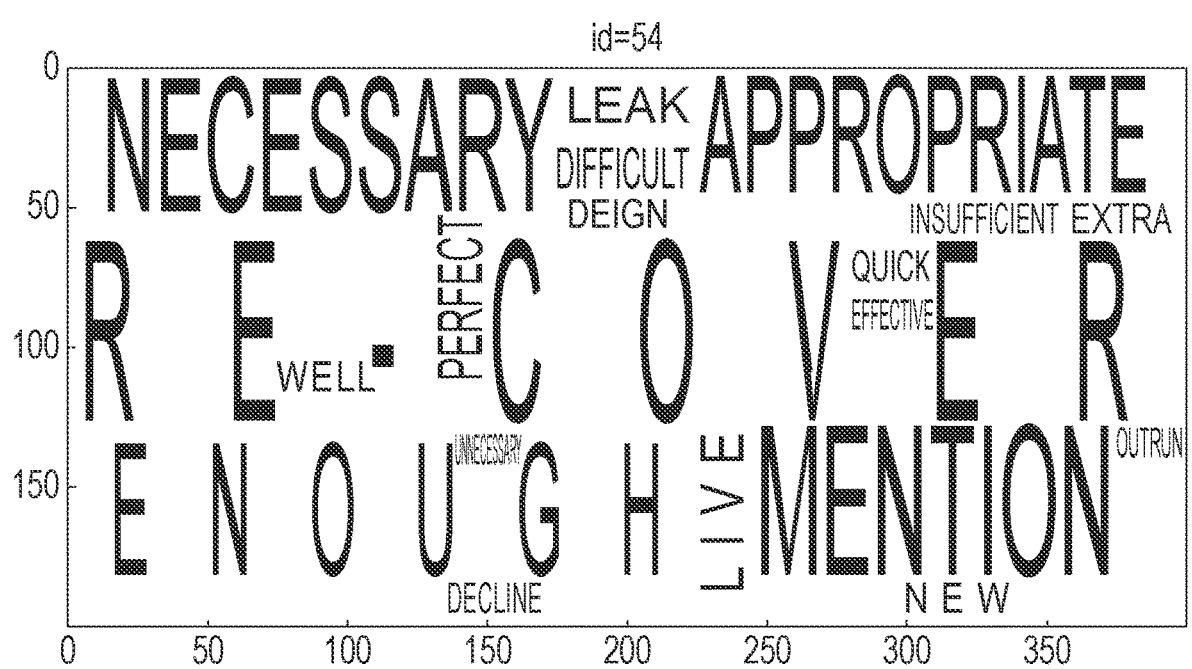
FIG. 5N is a drawing illustrating an exemplary word presentation screen.
Figure 5O:
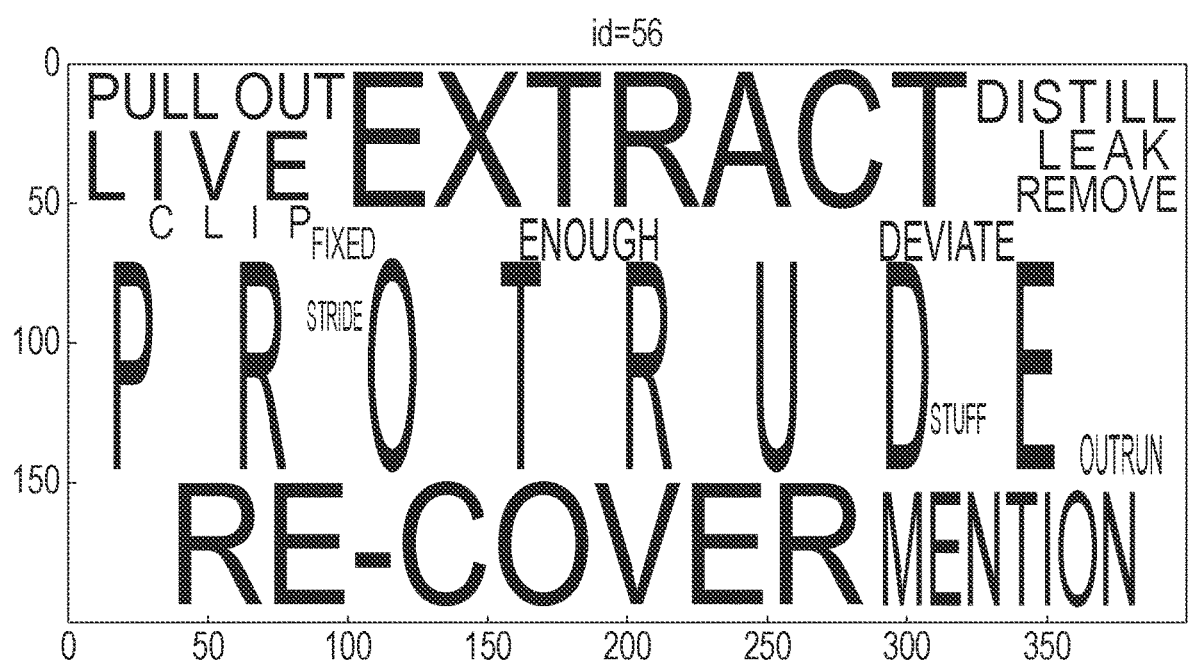
FIG. 5O is a drawing illustrating an exemplary word presentation screen.

The presentation screen in FIG. 5O is a presentation screen that corresponds to a cluster with an ID of 56 made by joining the cluster with the ID of 47 corresponding to FIG. 5J and a cluster with an ID of 54 corresponding to FIG. 5N. Viewing the presentation screen in FIG. 5O, there can be seen that each word has no unity as a whole (for example, no concept that unites "mention" and "protrude" can be found).

The presentation screen in FIG. 5K is a presentation screen that corresponds to a cluster with an ID of 50 made by joining a cluster with an ID of 10 corresponding to FIG. 5C and a cluster with an ID of 41 corresponding to FIG. 5H. Viewing the presentation screen in FIG. 5K, each word is a word that indicates a concept of "communication and determination," and there can be seen a unity as a whole.

The presentation screen in FIG. 5G is a presentation screen that corresponds to a cluster with an ID of 35 made by joining a cluster with an ID of 21 corresponding to FIG. 5E and a cluster with an ID of 30 corresponding to FIG. 5F.

Viewing the presentation screen in FIG. 5G, each word is a word that indicates a concept of "evaluation," and there can be seen a unity as a whole.

The presentation screen in FIG. 5M is a presentation screen that corresponds to a cluster with an ID of 53 made by joining the cluster with the ID of 35 corresponding to FIG. 5G and the cluster with the ID of 50 corresponding to FIG. 5K. Viewing the presentation screen in FIG. 5M, each word is a word that indicates a concept of "recognition and determination," and there can be seen a unity as a whole.

The presentation screen in FIG. 5N is a presentation screen that corresponds to a cluster with an ID of 54 made by joining a cluster with an ID of 51 corresponding to FIG. 5L and the cluster with the ID of 53 corresponding to FIG. 5M. Viewing the presentation screen in FIG. 5N, there can be seen that each word has no unity as a whole (for example, no concept that unites "re-cover" and "appropriate" can be found).

The user can confirm the cluster in which the feature values are aggregated with unity, and grasp on what sort of viewpoint a quality of the ticket data is identified as good or bad.

The user performs a selection operation, such as clicking and tapping, on the ID of the cluster that includes the feature values used for determining the evaluation criterion of the ticket data. In this embodiment, the user performs the selection operation on the ID of the cluster in which the feature values that are especially treated as important as indexes for good or bad in quality are aggregated. When detecting the selection operation on an ID of a cluster, the accepting unit 207 accepts specifying the cluster with the ID on which the selection operation has been performed, and determines the feature values corresponding to the cluster corresponding to the ID on which the selection operation has been performed as the feature values used for determining the evaluation criterion of the ticket data.

At S308, the accepting unit 207 determines whether the specification of the cluster is accepted or not via the specification screen output at S307.

The accepting unit 207 advances the process to a process at S309 when determining that the specification of the cluster is accepted, and terminates the process in FIG. 3 when determining that the specification of the cluster is not accepted.

At S309, the determining unit 208 determines the evaluation criterion for the ticket data based on the feature values corresponding to the cluster indicated by the specification determined to have been accepted at S308. For example, assume that the cluster indicated by the specification determined to have been accepted at S308 is the cluster with the ID of 47 in the dendrogram in FIG. 4. In this case, the feature values corresponding to the cluster indicated by the specification determined to have been accepted at S308 are three, "with state change—change in relationship—change in relationship (object)," "with state change—positional change—change in positional relationship (physical)," and "with state change—positional change—positional change (physical)."

For example, the determining unit 208 determines the evaluation criterion as follows. That is, the determining unit 208 identifies appearance frequencies of these feature values in the positive example data in the teacher data, and presents to the user by outputting by, for example, displaying the identified appearance frequencies on the display unit. The user confirms the appearance frequencies of the respective presented feature values to examine what an evaluation aspect should be (for example, whether to determine with threshold value or not, and what the threshold value should be then). The user performs an operation via an input device coupled via the input and output I/F 105 after the examination to instruct the evaluation aspect to the information processing apparatus 100.

The determining unit 208 determines the evaluation aspect based on the operation via the input device coupled via the input and output I/F 105. The determining unit 208, for example, obtains the instruction that indicates to perform the threshold determination and the value of the threshold used then based on the operation via the input device coupled via the input and output I/F 105. The determining unit 208 determines the evaluation criterion based on the obtained instruction, the obtained threshold value, and the feature values corresponding to the cluster indicated by the specification determined to have been accepted at S308. For example, assume that 1 is obtained as a threshold value to divide a low evaluation and a moderate evaluation, and 2 is obtained as a threshold value to divide the moderate evaluation and a high evaluation. In this case, the determining unit 208 determines an evaluation criterion that evaluates an evaluation value as the low evaluation when the appearance number of the feature values ("with state change—change in relationship—change in relationship (object)," "with state change—positional change—change in positional relationship (physical)," and "with state change—positional change—positional change (physical)") is less than one time, evaluates an evaluation value as the moderate evaluation when the appearance number of the feature values is one time or more and less than two times, and evaluates an evaluation value as the high evaluation when the appearance number of the feature values is two times or more.

The determining unit 208 may determine what sort of viewpoint the evaluation criterion is on for the determined evaluation criteria. For example, the user confirms the words in the presentation screen corresponding to the cluster, grasps what sort of concept each of the confirmed words indicates, and input the information (for example, character string) indicative of the grasped concept into the information processing apparatus 100 using the input device coupled via the input and output I/F 105. The determining unit 208 gives a label of a nature language onto the determined evaluation criterion such that a human can easily understand "on what sort of viewpoint the evaluation criterion based on the specified cluster is" based on the information input via the input device coupled via the input and output I/F 105.

The evaluation aspect includes an aspect that determines the evaluation value based on, for example, whether a deviation value of the appearance number of each feature value is within a predetermined range or not, other than the threshold determination of the appearance number of each feature value.

The determining unit 208 may determine the evaluation criterion based on the feature values corresponding to the cluster indicated by the specification determined to have been accepted at S308 and a preliminarily determined evaluation aspect without accepting specifying the evaluation aspect from the user.

The number of the clusters of which specifications have been accepted at S308 may be one or may be plural. When the plurality of clusters are specified, the determining unit 208 determines the evaluation criterion for each cluster at S309.

(Evaluating Process)

The evaluation unit 209 evaluates newly input ticket data using the evaluation criterion determined in the process in FIG. 3.

Assume that the evaluation criterion determined by the evaluation criterion determined at S309 is the evaluation criterion that evaluates an evaluation value to be a low evaluation when the appearance number of feature values (for example, "with state change—change in relationship—change in relationship (object)," "with state change—positional change—change in positional relationship (physical)," and "with state change—positional change—positional change (physical)") is less than one time, evaluates an evaluation value to be a moderate evaluation when the appearance number of feature values is one time or more and less than two times, and evaluates an evaluation value to be a high evaluation when the appearance number of feature values is two times or more.

In this case, the evaluation unit 209 extracts the feature values from the input ticket data, and identifies how any feature values that relate to the evaluation criterion are included in each of the extracted feature values. The evaluation unit 209 evaluates the ticket data by determining the evaluation value of the ticket data in accordance with the evaluation criterion based on the identified number.

The evaluation unit 209 evaluates the ticket data for each evaluation criterion when a plurality of the evaluation criteria are determined in the process in FIG. 3.

Thus, the evaluation unit 209 evaluates the ticket data using the evaluation criterion determined in the process in FIG. 3, thereby ensuring performing the evaluation on which the individuality of the user playing a role of evaluating is reflected. With this, the information processing apparatus 100 can reduce a labor by the user playing a role of evaluating to evaluate the ticket data.

The output unit 206, for example, outputs the evaluation result by the evaluation unit 209 by displaying it on the display unit. The output unit 206 may output an example sentence when the result of the evaluation by the evaluation unit 209 has not been a preliminarily determined evaluation value (for example, high evaluation). This example sentence information is preliminarily stored in the auxiliary storage unit 103. The output unit 206 may output advice information when the result of the evaluation by the evaluation unit 209 has not been a preliminarily determined evaluation value. The advice information is preliminarily stored in the auxiliary storage unit 103. With such a process, the output unit 206 can assist a creator of the ticket data in generating the ticket data. This example sentence information and the advice information are one example of supporting information for the creator of the ticket data.

The output unit 206, for example, outputs the evaluation result in the following format. Excellent, Good, and Poor in the following example of the evaluation result indicate a high evaluation, a moderate evaluation, and a low evaluation, respectively. Excellent, Good, and Poor each indicate evaluation values in different evaluation criteria. The description after Good and Poor is one example of the advice information for the creator of the ticket data.

---Evaluation Result Example---

Good—Description relating to "location or time" may be insufficient. Increasing information on specific location and precise date and time may be a good idea.
Poor—It seems there are few descriptions relating to "determination and prediction." Please increase description about how you recognize and determine event. There may be a pattern where recognition or determination is concluded as if it is a fact.
Good—Description relating to "purpose" could not be detected. When the issued ticket relates to continuous improvement, how about writing a purpose, such as what you would like to achieve?
Excellent—Precisely written about "object."
(Effect)

As described above, in this embodiment, the information processing apparatus 100 obtained the distributed representations of the words included in the segment corresponding to the plurality of feature values extracted from the teacher data, and aggregated the extracted plurality of feature values by clustering based on the obtained distributed representations. The vectors indicated by the distributed representations have the property to become close vectors as the meanings are close. With this, the information processing apparatus 100 can aggregate the similar feature values extracted from the document data.

The information processing apparatus 100 learned the classification model that identifies good or bad in quality of the ticket data based on the teacher data including the positive example and the negative example. Then, the information processing apparatus 100 extracted the plurality of feature values on which the individuality of the user in evaluating the ticket data is reflected based on the levels of contribution of the feature values of the teacher data in the learned classification model. The information processing apparatus 100 clustered and aggregated the extracted feature values to determine the plurality of clusters. With this, the information processing apparatus 100 can aggregate the similar feature values for the feature values on which the individuality of the user in evaluating the ticket data is reflected.

The information processing apparatus 100 accepted specifying the cluster including the feature values used for determining the evaluation criterion of the ticket data among each of the aggregated clusters, and determined the evaluation criterion of the ticket data based on the feature values included in the cluster indicated by the accepted specification. With this, the information processing apparatus 100 can determine the evaluation criterion of the ticket data on which the individuality of the user is reflected. While the individuality as information is implicit, and it is difficult to express, with the process of this embodiment, the information processing apparatus 100 can determine the evaluation criterion of the ticket data on which the individuality of the user is reflected. Further, the information processing apparatus 100 evaluates the ticket data based on the determined evaluation criterion. With this, the information processing apparatus 100 can perform the evaluation on which the individuality of the user is reflected for the ticket data, thereby ensuring the reduced labor by the user to directly evaluate the ticket data.
(Modification)

In this embodiment, the information processing apparatus 100 aggregates the feature values extracted from the teacher data, each of which is the ticket data. However, the information processing apparatus 100 may aggregate the feature values extracted from other data.

For example, the information processing apparatus 100 may extract the feature values for each segment with the process similar to that at S301 from a plurality of comments a certain user has posted in the past to a posting service of comments and the like. The information processing apparatus 100 identifies a head word in a segment corresponding to the extracted feature values, and obtains a distributed representation of the identified head word. The information processing apparatus 100 clusters the extracted feature values based on the obtained distributed representations to aggregate the feature values having a similar meaning. The information processing apparatus 100 displays the information indicative of the aggregated result on the display unit as a dendrogram as in FIG. 4 that includes the presentation screens in FIG. 5. With this, the user can grasp the individuality expressed in the comments posted by him or herself. For example, the user can grasp what sort of opinion he or she often posts to other people and the like.

In this embodiment, the evaluation unit 209 of the information processing apparatus 100 evaluates the newly input ticket data using the evaluation criterion determined in the process in FIG. 3.

However, the AI implemented in the information processing apparatus 100 may evaluate the newly input ticket data using the evaluation criterion determined in the process in FIG. 3. The AI implemented in an external information processing apparatus may evaluate the newly input ticket data using the evaluation criterion determined in the process in FIG. 3 by the information processing apparatus 100.

Embodiment 2

While in a conversation, such as a conventional meeting and discussion, a width of topic is limited within a range of ideas of the participants, when the range of ideas is small, it is possible that the argument gets stuck due to the lack of ideas or reworking occurs due to an oversight of risks.

Therefore, in order to yield ideas beyond a frame of a team of the participants, there has been the demand that desires to make a knowledge other than the knowledge of the current team, such as the knowledge of a team in the past, easily available.

Therefore, in this embodiment, a description will be given of a process in which the information processing apparatus 100 presents a viewpoint on which the conversation is possibly insufficient to a team that holds a meeting.

The hardware configuration and the function configuration of the information processing apparatus 100 in this embodiment is similar to those of Embodiment 1.

In this embodiment, the auxiliary storage unit 103 is assumed to preliminarily store minutes data (for example, document data, such as text data and voice data) that indicates contents of meetings held in the past. The minutes data is assumed to include data of positive example (positive example data) preliminarily confirmed to be an appropriate content by a user and data of negative example (negative example data) preliminarily confirmed to be an inappropriate content by the user.

An evaluation criterion determination process of this embodiment will be described with reference to FIG. 3. The process at S301 to S307 of this embodiment is similar to that of Embodiment 1 except that the minutes data is used instead of the ticket data.

In this embodiment, the information processing apparatus 100 is assumed to determine a plurality of evaluation criteria. The information processing apparatus 100, for example, determines the plurality of evaluation criteria by repeating the process at S308 to S309 for several times. The information processing apparatus 100, for example, may accept specifying a plurality of clusters at S308, and may determine the evaluation criterion based on the corresponding feature value for each of the plurality of clusters at S309. The information processing apparatus 100, for example, may determine the evaluation criterion based on the corresponding feature value for each of all the clusters at S309, assuming that specifying all the clusters is accepted at S308.

Assume that a certain team holds a meeting, and the minutes data of the meeting is newly input into the information processing apparatus 100 and is specified as an evaluation object.

The evaluation unit 209 evaluates the newly input minutes data using each of the plurality of evaluation criteria determined in the process in FIG. 3. The evaluation unit 209 determines a plurality of evaluation results corresponding to the respective plurality of evaluation criteria determined in the process in FIG. 3.

In this embodiment, each of the plurality of evaluation results corresponding to the respective plurality of evaluation criteria determined in the process in FIG. 3 is represented in a value that indicates the larger the better and the smaller the poorer.

The evaluation unit 209, for example, selects the preliminarily determined number of evaluation results in order from the smallest value among the plurality of these evaluation results. The evaluation unit 209, for example, may select the preliminarily determined number of evaluation results in order from the smallest value among the evaluation results equal to or lower than a preliminarily determined threshold value included in the plurality of these evaluation results. The evaluation unit 209 identifies the evaluation criteria that correspond to the respective selected evaluation results, and identifies clusters used for determining the identified evaluation criteria.

The output unit 206, for example, sorts the clusters identified by the evaluation unit 209 in order from the lowest corresponding evaluation result, and outputs the clusters by displaying them on the display unit.

As described above, in this embodiment, the information processing apparatus 100 determined the plurality of evaluation criteria based on the past minutes data, and the document data as the evaluation object was evaluated using the determined plurality of evaluation criteria. The information processing apparatus 100 selected a part of the evaluation results in order from the lowest one, and output the clusters corresponding to the evaluation criteria corresponding to the selected evaluation results. With this, the information processing apparatus 100 outputs the clusters that indicate viewpoints not appropriately included in the document data as the evaluation object, thereby ensuring presenting the viewpoints to a user belonging to the team holding the meeting. The user confirms the insufficient conversation on the viewpoints indicated by the presented clusters, thereby ensuring further appropriately conducting the subsequent conversation. Thus, the information processing apparatus 100 can make the knowledge other than the knowledge of the current team easily available.

The information processing apparatus 100 can continue keeping the knowledge of a person, for example, even though the person who held a meeting in the past has resigned, in order to make the knowledge other than the knowledge of the current team easily available without a human. The more the meeting is held, the more the available minutes data increases, and thus, the information processing apparatus 100 can make further more knowledge available.

Embodiment 3

In this embodiment, a description will be given of a process in which the information processing apparatus 100 presents a viewpoint on which the conversation is possibly insufficient to a team that holds a meeting with a method different from that of Embodiment 2.

The hardware configuration and the function configuration of the information processing apparatus 100 in this embodiment is similar to those of Embodiment 1.

In this embodiment, the auxiliary storage unit 103 is assumed to preliminarily store minutes data that indicates contents of the meetings held in the past similarly to Embodiment 2. In this embodiment, the minutes data preliminarily stored in the auxiliary storage unit 103 is data having no distinction between positive example data preliminarily confirmed to be an appropriate content by a user and negative example data preliminarily confirmed to be an inappropriate content by the user.

The process of this embodiment will be described.

In this embodiment, the obtaining unit 204 extracts words from teacher data using the past minutes data preliminarily stored in the auxiliary storage unit 103 as the teacher data, and obtains distributed representations of the extracted words. The aggregating unit 205 clusters the words extracted by the obtaining unit 204 based on the distributed representations obtained by the obtaining unit 204. Each of the obtained clusters as a result of this clustering is a word cluster that serves as feature values of the words. The word clusters are the feature values that indicate the respective plurality of clusters obtained by clustering the plurality of words. The word cluster as the feature value of a certain word indicates the cluster to which the word belongs. The aggregating unit 205 determines arranged words as a name of each word cluster for each of the word clusters. The arranged words have a preliminarily determined number of words that are the closest to the center of the cluster.

The output unit 206 outputs results of clustering by the aggregating unit 205. The output unit 206 may, for example, output the results of clustering by the aggregating unit 205 in a format of a dendrogram as illustrated in FIG. 4.

Afterwards, assume that a certain team holds a meeting, the minutes data of the meeting is newly input into the information processing apparatus 100, and is specified as an evaluation object.

The analyzing unit 201 extracts all the words included in the specified minutes data, and extracts the feature values (word clusters) for the respective extracted words. The analyzing unit 201, for example, obtains distributed representations of the respective extracted words, and extracts the word clusters of the respective words based on which clusters the obtained distributed representations belong to.

The analyzing unit 201 obtains an index that indicates how often the words corresponding to the feature values appear in the minutes data as the evaluation object for each feature value (word cluster). In this embodiment, a discussion rate defined as follows is used as this index. The discussion rate is an index defined as (a total number of words corresponding to a certain feature value included in minutes data as an evaluation object)/(a total number of words corresponding to the feature value included in teacher data (minutes data preliminarily stored in the auxiliary storage unit 103).

The analyzing unit 201 obtains the discussion rate for each feature value (word cluster). It can be interpreted that the higher the discussion rate is, the better the viewpoint corresponding to the feature value is discussed on. It can be interpreted that the lower the discussion rate is, the less sufficient the viewpoint corresponding to the feature value is discussed on.

The analyzing unit 201 selects the preliminarily determined number of discussion rates in order from the smallest value among the obtained discussion rates. The analyzing unit 201 may, for example, select the preliminarily determined number of discussion rates in order from the smallest value among the discussion rates equal to or less than a preliminarily determined threshold value included in the obtained discussion rates. The analyzing unit 201 identifies the feature values (word clusters) corresponding to the selected discussion rates.

The output unit 206 sorts the feature values identified by the analyzing unit 201 into order from the lowest corresponding discussion rate and outputs them by displaying them on the display unit. With this, the output unit 206 can present the viewpoints on which the argument is interpreted as insufficient to the user. The output unit 206 may output a screen that presents the words (words included in word clusters) corresponding to the feature values identified by the analyzing unit 201 by displaying them on the display unit. With this, the output unit 206 can present the viewpoints on which the argument is interpreted as insufficient to the user in more details.

In this embodiment, the discussion rate as the index to indicate how often the words corresponding to the feature values appear in the minutes data as the evaluation object for each feature value (word cluster) was defined as (a total number of words corresponding to a certain feature value included in minutes data as an evaluation object)/(a total number of words corresponding to the feature value included in teacher data (minutes data preliminarily stored in the auxiliary storage unit 103). However, the discussion rate may be an index defined as described below.

First, for a word group (a collection of a plurality of words), a volume of the word group is defined as follows. That is, a volume (hypervolume) of a convex hull in a vector space (semantic space) of distributed representations is defined as the volume of the word group. Using points selected from a plurality of points indicating vectors corresponding to the respective words included in a certain word group as respective apexes, the convex hull contains all the points other than the points used as the apexes among the plurality of points.

The discussion rate may, for example, be an index defined as follows by using this volume of word group. That is, the discussion rate may be an index defined as (a volume of a word group as a collection of all words corresponding to a certain feature value included in minutes data as an evaluation object)/(a volume of a word group as a collection of all words corresponding to the feature value included in teacher data (minutes data preliminarily stored in the auxiliary storage unit 103).

In such a case, the analyzing unit 201 obtains the discussion rate as follows. That is, the analyzing unit 201, first, identifies a word group as a collection of all words that correspond to a certain feature value included in minutes data as an evaluation object, and identifies points on semantic space of all the words included in the identified word group. The analyzing unit 201, using points included in the identified points as apexes, identifies a convex hull on the semantic space containing all except for the points used as the apexes among the identified points, and obtains a volume (hypervolume) of the identified convex hull as the volume of the word group.

Next, the analyzing unit 201 identifies a word group as a collection of all words corresponding to the feature value included in minutes data preliminarily stored in the auxiliary storage unit 103, and identifies points on semantic space of all the words included in the identified word group. The analyzing unit 201, using the points included in the identified points as apexes, identifies a convex hull on the semantic space that contains all except for the points used as the apexes among the identified points, and obtains a volume (hypervolume) of the identified convex hull as the volume of the word group.

The analyzing unit 201 obtains the discussion rate by, for example, dividing the volume of the words obtained from the minutes data as the evaluation object by the volume of the words obtained from the minutes data, which is preliminarily stored in the auxiliary storage unit 103, as the teacher data.

In this embodiment, the minutes data preliminarily stored in the auxiliary storage unit 103 was the data having no distinction between the positive example data preliminarily confirmed to be the appropriate content by the user and the negative example data preliminarily confirmed to be the inappropriate content by the user. However, the minutes data preliminarily stored in the auxiliary storage unit 103 may be data having a distinction between the positive example data preliminarily confirmed to be the appropriate content by the user and the negative example data preliminarily confirmed to be the inappropriate content by the user.

In such a case, the information processing apparatus 100, for example, performs the following process.

The information processing apparatus 100 performs a process similar to that of Embodiment 2 up to the process at S307, except that the word cluster is used as the feature value extracted at S301 and used in the subsequent process.

Assume that, afterwards, a certain team holds a meeting, and the minutes data of the meeting is newly input into the information processing apparatus 100, and is specified as the evaluation object.

The analyzing unit 201 extracts all words included in the specified minutes data, and extracts feature values (word clusters) for each of the extracted words. The analyzing unit 201 obtains a discussion rate that indicates how often the words corresponding to the feature values appear in the minutes data as the evaluation object for each feature value (word cluster). The discussion rate in this case is, for example, obtained as (a total number (volume) of words corresponding to a certain feature value included in minutes data as an evaluation object)/(a total number (volume) of words corresponding to the feature value included in teacher data (past minutes data subject for the feature value extraction at S301)).

The analyzing unit 201, for example, obtains the discussion rate for each feature value (word cluster), and selects the preliminarily determined number of discussion rates in order from the smallest value among the obtained discussion rates. The analyzing unit 201 may, for example, select the preliminarily determined number of discussion rates in order from the smallest value among the discussion rates equal to or less than a preliminarily determined threshold value included in the obtained discussion rates. The analyzing unit 201 identifies the feature values (word clusters) corresponding to the selected discussion rates. The output unit 206 sorts the feature values identified by the analyzing unit 201 into order from the lowest corresponding discussion rate, and output them by displaying them on the display unit. The output unit 206 may output the word groups corresponding to the respective feature values.

When the minutes data preliminarily stored in the auxiliary storage unit 103 has a distinction between the positive example data and the negative example data, the information processing apparatus 100 may perform the process described above.

The minutes data preliminarily stored in the auxiliary storage unit 103 has a distinction between the positive example data and the negative example data, the information processing apparatus 100 may perform the following process.

The obtaining unit 204 identifies a collection of words excluding words included in the negative example data from a collection of words included in the positive example data. The obtaining unit 204 extracts the words from the collection of the identified words, and obtains distributed representations of the extracted words. The aggregating unit 205 clusters the words included in the collection of the identified words based on the distributed representations obtained by the obtaining unit 204. As a result of this clustering, each of the obtained clusters is set to be a word cluster as the feature value. The aggregating unit 205 generates a dendrogram as in FIG. 4 as a result of the process of the clustering.

Then, the output unit 206 outputs the result of the clustering by the aggregating unit 205.

Assume that, afterwards, a certain team holds a meeting, and the minutes data of the meeting is newly input into the information processing apparatus 100, and is specified as the evaluation object.

The analyzing unit 201 extracts all words included in the specified minutes data, and extracts feature values (word clusters) for each of the extracted words. The analyzing unit 201 obtains a discussion rate that indicates how often the words corresponding to the feature value appear in the minutes data as the evaluation object for each feature value (word cluster). The discussion rate in this case is, for example, obtained as (a total number (volume) of words corresponding to a certain feature value included in minutes data as an evaluation object)/(a total number (volume) of words corresponding to the feature values included in teacher data (positive example data included in past minutes data preliminarily stored in the auxiliary storage unit 103).

The analyzing unit 201, for example, obtains the discussion rate for each feature value (word cluster), and selects the preliminarily determined number of discussion rates in order from the smallest value among the obtained discussion rates. The analyzing unit 201 may, for example, select the preliminarily determined number of discussion rates in order from the smallest value among the discussion rates equal to or less than a preliminarily determined threshold value included in the obtained discussion rates. The analyzing unit 201 identifies the feature values (word clusters) corresponding to the selected discussion rates. The output unit 206 sorts the feature values identified by the analyzing unit 201 in order from the lowest corresponding discussion rate, and outputs them by displaying them on the display unit. The output unit 206 may also output the word groups corresponding to the respective feature values.

When the minutes data preliminarily stored in the auxiliary storage unit 103 includes the positive example data and the negative example data, the information processing apparatus 100 may perform the process described above.

When the minutes data preliminarily stored in the auxiliary storage unit 103 has a distinction between the positive example data and the negative example data, the information processing apparatus 100 may perform the following process.

The obtaining unit 204 identifies a collection of words excluding words included in the positive example data from a collection of words included in the negative example data. The obtaining unit 204 extracts words from a collection of the identified words, and obtains distributed representations of the extracted words. The aggregating unit 205 clusters the words included in the collection of the identified words based on the distributed representations obtained by the obtaining unit 204. As a result of this clustering, each of the obtained clusters is set to be a word clusters as the feature value. In this case, the word clusters as the feature values are clusters of words that appear only in the negative example data and do not appear in the positive example data. Therefore, it can be interpreted that the higher the frequency of appearance of the words having these feature values, the more the conversation on inappropriate viewpoints is conducted.

The aggregating unit 205 generates a dendrogram as in FIG. 4 as a result of the process of the clustering. The output unit 206 outputs the result of the clustering by the aggregating unit 205.

Assume that, afterwards, a certain team holds a meeting, and the minutes data of the meeting is newly input into the information processing apparatus 100, and is specified ad the evaluation object.

The analyzing unit 201 extracts all words included in the specified minutes data, and extracts feature values (word clusters) for each of the extracted words. The analyzing unit 201 obtains a discussion rate indicating how often the words corresponding to the feature values appear in the minutes data as the evaluation object for each feature value (word cluster). The discussion rate in this case is, for example, obtained as (a total number (volume) of words corresponding to a certain feature value included in minutes data as an evaluation object)/(a total number (volume) of words corresponding to the feature value included in teacher data (negative example data included in past minutes data preliminarily stored in the auxiliary storage unit 103).

The analyzing unit 201, for example, obtains the discussion rate for each feature value (word cluster), and selects the preliminarily determined number of discussion rates in order from the highest value among the obtained discussion rates. The analyzing unit 201 may, for example, select the preliminarily determined number of discussion rates in order from the highest value among the discussion rates equal to or more than a preliminarily determined threshold value included in the obtained discussion rates. The analyzing unit 201 identifies the feature values (word clusters) corresponding to the selected the discussion rates. The output unit 206 sorts the feature values identified by the analyzing unit 201 into order from the highest corresponding discussion rate, and outputs them by displaying them on the display unit. The output unit 206 may also output the word groups corresponding to the respective feature values.

With this, the information processing apparatus 100 can present inappropriate viewpoints that are discussed to the user, and call user's attention on the fact that the conversation is continued on such viewpoints.

When the minutes data preliminarily stored in the auxiliary storage unit 103 includes the positive example data and the negative example data, the information processing apparatus 100 may perform the process described above.

As described above, in this embodiment, the information processing apparatus 100 obtained the discussion rate for each of the extracted feature values, and identified the feature values indicating the viewpoints (such as viewpoint on which argument is interpreted as insufficient and viewpoint on which inappropriate argument has been made) on which an attention should be paid in the conversation corresponding to the minutes data as the evaluation object based on the obtained discussion rates. The information processing apparatus 100 presented the identified feature values to the user who belongs to the team holding the meeting by outputting them. With this, the user can grasp the viewpoint on which the attention should be paid. The user can further appropriately conduct the subsequent conversation after grasping the viewpoint indicated by the presented feature values. Thus, the information processing apparatus 100 can make the knowledge other than the knowledge of the current team easily available.

Other Embodiments

In Embodiments 1 to 3, the information processing apparatus 100 was an information processing apparatus alone. However, the information processing apparatus 100 may be configured as a system including a plurality of the information processing apparatuses communicatively coupled to one another via a network (LAN and Internet). In such a case, the respective CPUs of the plurality of information processing apparatuses included in the information processing apparatus 100 execute the processes in cooperation based on programs stored in auxiliary storage units of the respective information processing apparatuses, and thus, the function in FIG. 2, the process in the flowchart in FIG. 3, and the like are achieved.

In Embodiments 1 and 2, the information processing apparatus 100 clustered the plurality of feature values based on the distributed representations of the words corresponding to each of the feature values, determined the evaluation criteria based on the clustering results, and output the feature values indicating the viewpoints on which the conversation is insufficient and the words corresponding to the feature values as the evaluation results based on the determined evaluation criteria, thereby presenting it to the user.

However, the information processing apparatus 100 may use a segment and a sentence, a paragraph (string of sentence), a document (string of paragraph (string of sentence)) (hereinafter, referred to as a segment and the like) instead of a word, and use a vector obtained by using, for example, the neural language model (existing method of deep learning) and the like from the segment and the like instead of the distributed representation of the word. Using the neural language model and the like, the vector that corresponds to the segment and the like having a property similar to that of the distributed representation of the word that becomes a close vector to one another as the meanings of each other are close for the segment and the like can be obtained. Hereinafter, such a vector is a segment and the like vector.

In such a case, the information processing apparatus 100 clusters the plurality of feature values based on the segment and the like vector of the segment and the like corresponding to each of the feature values, determines the evaluation criteria based on the clustering results, and outputs the feature values indicating the aspects on which the conversation is insufficient and the segment and the like corresponding to the feature values as the evaluation results based on the determined evaluation criteria, thereby presenting it to the user.

In Embodiments 2 and 3, the description has been made of the process in which the information processing apparatus 100 determines the word clusters as the feature values by clustering the words included in the past minutes data, obtains the discussion rate for each feature value (word cluster), and outputs the feature values corresponding to the discussion rates selected from the large (small) ones among the obtained discussion rates and the words corresponding to the feature values. However, the information processing apparatus 100 may use the segment and the like instead of the word and use the segment and the like vector instead of the distributed representation of the word.

In such a case, the information processing apparatus 100 may determine segment and the like clusters as the feature values by clustering the segment and the like included in the past minutes data, obtains the discussion rate for each of the feature values (the segment and the like cluster), and output the feature values corresponding to the discussion rates selected from the large (small) ones among the obtained discussion rates and the segment and the like corresponding to the feature values. In this case, the discussion rate is, for example, obtained as (a total number (volume) of segment and the like corresponding to a certain feature value included in minutes data as an evaluation object)/(a total number (volume) of segment and the like corresponding to the feature value included in teacher data (past minutes data preliminarily stored in the auxiliary storage unit 103)).

While preferable embodiments of the present invention have been described above in details, the present invention is not limited to such specific embodiments.

For example, a part or all of the function configuration of the above-described information processing apparatus 100 may be implemented in the information processing apparatus 100 as hardware.

The invention claimed is:

1. An information processing apparatus comprising:
   an extractor configured to extract a plurality of feature values from input data as document data;
   an obtainer configured to obtain distributed representations of words that correspond to the respective plurality of feature values extracted by the extractor, wherein the distributed representations are represented by vectors of a plurality of dimensions;
   an aggregator configured to aggregate the plurality of feature values extracted by the extractor into a plurality of classifications based on distances between the vectors of the distributed representations;
   an acceptor configured to accept a specification of a classification including a feature value used for determining an evaluation criterion for document data among the plurality of classifications aggregated by the aggregator; and
   a determiner configured to determine the evaluation criterion based on a feature value included in a classification indicated by the specification accepted by the acceptor.

2. The information processing apparatus according to claim 1, wherein the aggregator is further configured to output information indicative of the plurality of classifications aggregated.

3. The information processing apparatus according to claim 1, further comprising an evaluator configured to evaluate document data based on the evaluation criterion determined by the determiner.

4. The information processing apparatus according to claim 3, wherein the evaluator is further configured to output a result of the evaluation.

5. The information processing apparatus according to claim 4, wherein the evaluator is further configured to output supporting information for a creator of document data when the result of the evaluation by the evaluator is a preliminarily determined evaluation value.

6. The information processing apparatus according to claim 3, wherein the evaluator evaluates document data based on each of a plurality of the evaluation criterion determined by the determiner, and
   the information processing apparatus is further configured to output a classification included in the plurality of classifications selected based on a plurality of evaluation results by the evaluator that correspond to a respective plurality of the evaluation criterion determined by the determiner.

7. The information processing apparatus according to claim 1 wherein the acceptor further accepts a specification of an evaluation aspect in the evaluation criterion, and
   the determiner determines the evaluation criterion based on the classification and the evaluation aspect indicated by the specification accepted by the acceptor.

8. The information processing apparatus according to claim 1, wherein the acceptor accepts a specification of a classification that includes a feature value used for determining the evaluation criterion among the plurality of classifications aggregated by the aggregator via a specification screen used for specifying a classification including a feature value used for determining the evaluation criterion.

9. The information processing apparatus according to claim 8, wherein the specification screen includes information indicative of a word that corresponds to a feature value included in a classification for each of the plurality of classifications aggregated by the aggregator.

10. The information processing apparatus according to claim 1, wherein the input data includes positive example data and negative example data, the positive example data being confirmed to be a positive example by a user, the negative example data being confirmed to be a negative example by the user, and
    the extractor extracts the plurality of feature values based on levels of contribution of respective feature values of the input data in a classification model learned based on the input data and used for identifying whether document data is a positive example or a negative example.

11. The information processing apparatus according to claim 10, wherein the extractor extracts a preliminarily determined number of feature values in order from a largest level of contribution as the plurality of feature values based on levels of contribution of respective feature values of the input data in the classification model.

12. The information processing apparatus according to claim 10, wherein the extractor extracts feature values of which levels of contribution are equal to or more than a preliminarily determined threshold value as the plurality of feature values based on levels of contribution of respective feature values of the input data in the classification model.

13. The information processing apparatus according to claim 1, wherein the extractor is further configured to output a feature value selected based on an index indicating how often each of words corresponding to the respective plurality of feature values extracted by the extractor appears in specified document data.

14. The information processing apparatus according to claim 1, wherein the extractor is further configured to output a word that corresponds to a feature value selected based on an index indicating how often each of words corresponding to the respective plurality of feature values extracted by the extractor appears in specified document data.

15. An information processing method executed by an information processing apparatus, the method comprising:
    an extracting step of extracting a plurality of feature values from input data as document data;
    an obtaining step of obtaining distributed representations of words that correspond to the respective plurality of feature values extracted at the extracting step, wherein the distributed representations are represented by vectors of a plurality of dimensions;
    an aggregating step of aggregating the plurality of feature values extracted at the extracting step into a plurality of classifications based on distances between the vectors of the distributed representations;

an accepting step of accepting a specification of a classification including a feature value used for determining an evaluation criterion for document data among the plurality of classifications aggregated at the aggregating step; and a determining step of determining the evaluation criterion based on a feature value included in a classification indicated by the specification accepted at the accepting step.

16. A computer-readable recording medium that records a program for causing a computer to execute:

an extracting step of extracting a plurality of feature values from input data as document data;

an obtaining step of obtaining distributed representations of words that correspond to the respective plurality of feature values extracted at the extracting step, wherein the distributed representations are represented by vectors of a plurality of dimensions;

an aggregating step of aggregating the plurality of feature values extracted at the extracting step into a plurality of classifications based on distances between the vectors of the distributed representations;

an accepting step of accepting a specification of a classification including a feature value used for determining an evaluation criterion for document data among the plurality of classifications aggregated at the aggregating step; and a determining step of determining the evaluation criterion based on a feature value included in a classification indicated by the specification accepted at the accepting step.

* * * * *